United States Patent
Hatanaka

(10) Patent No.: US 7,877,467 B2
(45) Date of Patent: Jan. 25, 2011

(54) NETWORK EQUIPMENT SYSTEM

(75) Inventor: Tomoyuki Hatanaka, Yamatotakada (JP)

(73) Assignee: Panasonic Electric Works Co., Ltd, Kadoma-shi (JP)

( * ) Notice: Subject to any disclaimer, the term of this patent is extended or adjusted under 35 U.S.C. 154(b) by 890 days.

(21) Appl. No.: 11/793,139

(22) PCT Filed: Dec. 28, 2006

(86) PCT No.: PCT/JP2006/326258

§ 371 (c)(1),
(2), (4) Date: Jun. 18, 2007

(87) PCT Pub. No.: WO2007/074905

PCT Pub. Date: Jul. 5, 2007

(65) Prior Publication Data

US 2009/0271470 A1  Oct. 29, 2009

(30) Foreign Application Priority Data

Dec. 28, 2005 (JP) .............................. 2005-379947

(51) Int. Cl.
*G06F 15/177* (2006.01)
(52) U.S. Cl. ................... 709/220; 709/208; 709/213; 709/219; 709/223; 709/228
(58) Field of Classification Search ................ 709/208, 709/213, 219, 220, 223, 228
See application file for complete search history.

(56) References Cited

U.S. PATENT DOCUMENTS 6,968,365 B2 * 11/2005 Hollstrom et al. ........... 709/217
7,197,365 B2 * 3/2007 Hori et al. ..................... 700/19

(Continued)

FOREIGN PATENT DOCUMENTS

JP  8-137697  5/1996

(Continued)

OTHER PUBLICATIONS

Y. Honishi, "ObjectDirector;" *FUJITSU*; vol. 48; No. 2. Mar. 10, 1997; pp. 93-97/Abstract.

(Continued)

*Primary Examiner*—Michael Won
(74) *Attorney, Agent, or Firm*—Edwards Angell Palmer & Dodge LLP

(57) ABSTRACT

This network equipment system is a system of a functional processing system, and is configured so that each network device performs a function assigned to itself whereby the whole system performs the predetermined action. Each network device has a function memory part 10, a variable memory exchanger 11, an execution function selector 12, and a function execution part 13. The variable memory exchanger 11 is connected to each network device through a telecommunications line, and it stores a variable necessary for execution of the functions stored in the function memory part 10 of each network device, and it shares the variable among the network devices. The execution function selector refers the variable stored in the variable memory exchanger, and it selects an executable function out of the functions stored in the function memory part. The function execution part executes the function selected by the execution function selector and updates the variable stored in the variable memory exchanger by the execution result.

7 Claims, 2 Drawing Sheets

U.S. PATENT DOCUMENTS

| | | | |
|---|---|---|---|
| 7,287,257 B2 * | 10/2007 | Meza | 719/321 |
| 7,469,277 B2 * | 12/2008 | Hirata et al. | 709/219 |
| 7,502,848 B2 * | 3/2009 | Motoyama et al. | 709/224 |
| 7,610,380 B2 * | 10/2009 | Igarashi et al. | 709/226 |
| 7,739,373 B2 * | 6/2010 | Ohnishi | 709/224 |

FOREIGN PATENT DOCUMENTS

| | | |
|---|---|---|
| JP | 2002-57785 | 2/2002 |
| JP | 2004-265425 | 9/2004 |
| WO | WO-00/41053 | 7/2000 |

OTHER PUBLICATIONS

Zeidner, L.E., "The Server Network Generator (SNG): a CASE tool for distributed cooperative processing," International Conference on APL, vol. 21, No. 4, Aug. 4, 1991-Aug. 8, 1991, pp. 369-385.

European Search Report dated Jun. 16, 2009, issued in EP 06 84 3636.

* cited by examiner

NETWORK EQUIPMENT SYSTEM

TECHNICAL FIELD

The present invention relates to a network equipment system and, more particularly, to a network equipment system of a distributed functional processing system.

BACKGROUND ART

A network equipment system in which a plurality of network devices are connected to each other through telecommunications lines such as the Internet and they perform a predetermined action in concert with each other has been provided. For example, a system in which a home server and various equipment devices in a home (for example, an information display device, an air-conditioning control device, and so on) are connected to each other through the Internet and which controls the equipment devices in the home and/or monitors the power in the home through the Internet has been provided.

Heretofore, in order to design such a system, an object-oriented language is widely used. The object-oriented language has features such as encapsulation, inheritance, polymorphism, and it is effective for especially a large-scale software development.

When a new network device is added to a network equipment system constituted by the object-oriented language, it is necessary to examine the influence of the new network device upon the whole system, and it requires a lot of time and effort as the system becomes complex. This is because the objects in the object-oriented language operate while interacting with each other, and when an object is added, the states of other objects are influenced by the added object. If the investigation of the system is imperfect, so-called deadlock may occur. Therefore, as the system becomes complex, it becomes difficult to add a new network device to the network equipment system constituted by the object-oriented language. Furthermore, because the object has much internal state information, if a problem arises in investigating the system, it is necessary to identify the internal state information and to re-create the state in order to re-create the problem, so, debugging is not easy.

By the way, Japanese Non-examined Patent Publication No. 8-137697 discloses an autonomous distributed system in which a plurality of agents communicate and work together to process a task according to a predetermined system characteristics. In this distributed system, a problem of a whole system is decomposed (broken down) into subproblems capable of being resolved independently, and each agent determines its share of the subproblems by negotiation. Each subproblem is configured so that it is does not depend on other subproblems and a result of each subproblem is not required for other subproblems. In this autonomous distributed system, it is described that it becomes easy to maintain the system, such as a change of a system configuration, because each agent resolves a problem autonomously.

So, in order to deal with a system change easily, it is conceivable to apply such an autonomous distributed system to the above-mentioned network equipment system. However, in the above network equipment system, because it is difficult to decompose a problem of a whole system into subproblems and there is a dependence relationship between the decomposed subproblems, it is difficult to apply the autonomous distributed system of the above publication.

DISCLOSURE OF THE INVENTION

In view of the above problem, the object of the present invention is to provide a network equipment system which is capable of dealing with a system change and system expansion easily and in which there is no fear of occurrence of the deadlock and which can perform optimization of the system.

In order to solve the above problem, an inventor of the present invention focused attention on a so-called functional language. The functional language is a programming language (for example, Haskell) having a mathematical language specification, and it does not have a concept of a state, and a result thereof is determined by only an argument (arguments), and it has no side-effect and has referential transparency.

The network equipment system of the present invention is a network equipment system in which a plurality of network devices connected to a telecommunications line perform a predetermined action in concert with each other, and the whole system is configured by a combination of functions of the functional language. And, the functions of the whole system are distributed to each network device appropriately, and each network device performs a function (functions) assigned to itself, whereby the system performs the predetermined action as a whole.

Each network device comprises a function memory part, a variable memory exchanger, an execution function selector, and a function execution part. The function memory part stores the functions which need to be executed by its own network device. The variable memory exchanger is connected to each network device through the telecommunications line, and it stores a variable necessary for execution of the functions stored in the function memory part of each network device, and it shares the variable among the network devices. The execution function selector refers the variable stored in the variable memory exchanger, and it selects an executable function out of the functions stored in the function memory part of its own network device. The function execution part executes the function selected by the execution function selector with the variable stored in the variable memory exchanger, and it updates the variable stored in the variable memory exchanger by a variable obtained by the execution of the function.

In the functional language, a variable necessary for execution of a function is monitored, and when all variables necessary for the execution of the function are constrained, the function can be executed. In a conventionally studied functional processing system, because each function is processed mainly inside a computer, it is easy to monitor the variable necessary for execution of a function. However, if the functional processing system is applied to the network equipment system in which network devices are installed at remote locations as the present invention, how to monitor the variables becomes a problem. The inventor of the present invention resolved this problem by providing the above-mentioned function memory part, the variable memory exchanger, the execution function selector, and the function execution part in each network device.

That is, in the network equipment system of the present invention, variables necessary for execution of functions of the whole system are stored and shared in the variable memory exchanger of each of the network devices connected to each other through a telecommunications line. The execution function selector refers the variable shared by the variable memory exchanger, and if there is an executable function out of the functions stored in the function memory part of its own network device, it selects the function. The function execution part executes the function selected by the execution function selector, and it updates (or constrains) the variable stored in the variable memory exchanger by the execution result. The updated variable is used by another function, and according to the execution result of the function, the variable stored in the variable memory exchanger is updated again.

By the above configuration, the network equipment system of the distributed functional processing system in which the functional processing system is applied to the distributed network devices can be realized. Because this network equipment system is configured by the functional processing system, even if a new function is added, it has not side-effects, whereby it is possible to deal with the system change easily. Furthermore, because the functional processing system does not depend on execution sequence, there is no fear of generating the deadlock. Furthermore, it is possible to perform optimization of the system by distributing the functions appropriately to each network device. Regardless of how to distribute the functions, it is possible to mathematically ensure that the behavior of the whole system does not change.

Preferably, the function memory part stores at least a function peculiar to its own network device. The function peculiar to its own network device is a function which can be executed by only its own network device, and in many cases, it is a function concerning input and output, such as a function which reads a value of a sensor, for example. In the network equipment system, each network device has a function peculiar to its own network device, such as a function which reads a value of a sensor, in many cases, so it is not possible to distribute all functions to the whole system. Therefore, by storing at least a function peculiar to its own network device in the function memory part of its own network device and by distributing and assigning other functions which are not peculiar to its own network device to each network device, it is possible to realize the network equipment system of the functional processing system in which a process is performed in chronological order according to the input and output.

Preferably, the network device further has a function distribution negotiation part. The function distribution negotiation part is connected to other network devices through the telecommunications line, and it has capability of delegating, to other network devices, a function other than a function peculiar to its own network device out of the functions stored in the function memory part. The function memory part stores the function which was delegated from other network devices by the function distribution negotiation part. In this case, it is possible to dynamically change a calculation agent of a function, whereby it is possible to perform optimization of the system and to enhance the ability of the system in a distributed manner.

Preferably, the function distribution negotiation part makes an inquiry to each network device about its processing load, and it receives an answer from each network device, and, based on the answer, it determines the network device to which a function is delegated. In this case, it is possible to select a desirable network device to delegate the function. In addition, the above-mentioned processing load includes load status of each network device, processing time necessary for execution of a function, and so on.

Preferably, at least one of the plurality of network devices has a function repository for storing implementation of the function which is used in this network equipment system, and each network device further has a function implementation memory part for storing implementation of a predetermined function which is necessary for the function execution part to execute the function, and a function implementation addition part which obtains, from the function repository, the implementation of a function which is not stored in the function implementation memory part out of the functions delegated from other network devices by the function distribution negotiation part. In this case, it becomes easy to change and extend the system.

Preferably, each network device further has a variable publication controller which classifies the variables stored in the variable memory exchanger into a shared variable which is to be shared among the network devices and a non-shared variable which is not shared among the network devices, and the variable memory exchanger shares only the shared variable among the network devices though the telecommunications line. In this case, it is possible to restrain the variable memory exchanger from sharing an unnecessary variable, and it is possible to lower a network load for sharing the variables.

Preferably, the plurality of network devices include at least a center server, a home server installed in a home, and an equipment device installed in the home. In this case, it is possible to create a home system in which the center server, the home server in a home, and the equipment device are connected with each other, and it is possible to increase processing capability of the system by distributing functions to the center server or the home server with high processing capability.

BEST MODE FOR CARRYING OUT THE INVENTION

Hereinafter, the present invention will be described in more detail with reference to the accompanying drawings.

Figure 1:
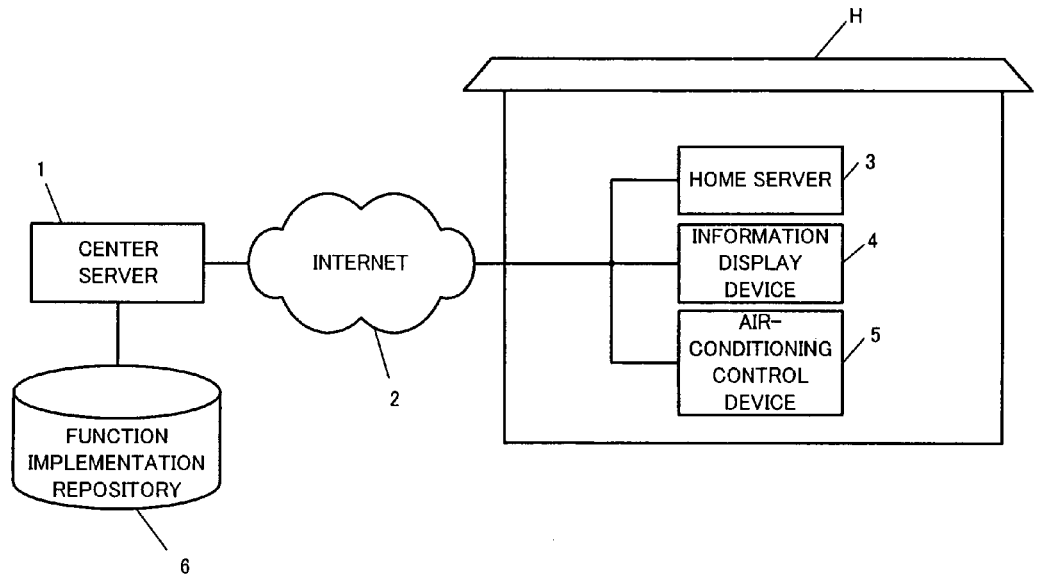
FIG. 1 is a view showing a configuration of a network equipment system in accordance with an embodiment of the present invention.

FIG. 1 is a view showing a configuration of a network equipment system of a distributed functional processing system in accordance with an embodiment of the present invention. In this network equipment system, as network devices, a center server 1, a home server 3 installed in a home H, and various equipment devices, such as an information display device 4 and an air-conditioning control device 5 installed in the home H, are connected to each other through the Internet 2 and a LAN. Although, in order to facilitate understanding, only the above-mentioned network devices are taken as an example in this embodiment, the network devices are not limited to them, of course.

The center server 1 is configured by a general-purpose computer device with network capability, and it has a function implementation repository 6 for storing implementation of functions which are used in this network equipment system.

The home server 3 provides each equipment device in the home with various capabilities (functions) though the LAN in concert with the center server 1. The home server 3 may have gateway capability, web server capability, and so on.

The information display device 4 has a display, and it can show variety of information on the display.

The air-conditioning control device 5 has a temperature sensor (not shown) for detecting temperature inside the home, and it can control air conditioning in the home from both inside and outside of the home through the Internet. When a user manipulates the air-conditioning control device 5 in the home, an operation screen of the air-conditioning control device 5 is shown on the display of the information display device 4, and the user can manipulate the air-conditioning control device 5 while seeing the display of the information display device 4.

This network equipment system is a functional processing system in which the whole system is configured by a combination of the functions. That is, the capabilities of the whole system are described by a combination of the functions of the functional language. In the system of the functional processing system, any network device can execute a function except for a function peculiar to each network device. In other words, in the network equipment system, an execution place of a function, that is, a calculation entity is not considered. Therefore, in this network equipment system, the functions necessary for the whole system are distributed to each network device appropriately, and each network device performs a function assigned to itself, whereby the system performs the predetermined action as a whole.

As to a method for distributing the functions, for example, a list of the functions to be assigned to each network equipment according to a combination of the network devices may be stored in the center server 1 or the home server 3, and the center server 1 or the home server 3 may statically distribute the functions to each network device according to the combination of the network device while referring the list. Or, when the combination of the network devices is not included in the list, or the center server 1 and the home server 3 do not have the list, the center server 1 or the home server 3 may fetch the processing capacity (or, the specifications) of each network device from each network device, and it may simulate an optimal distribution method based on the processing capacity of each network device, and it may dynamically distribute the functions to each network device based on the simulation result. Or, as will be described in detail later, each network device may dynamically distribute the functions to each other by negotiation.

Figure 2:
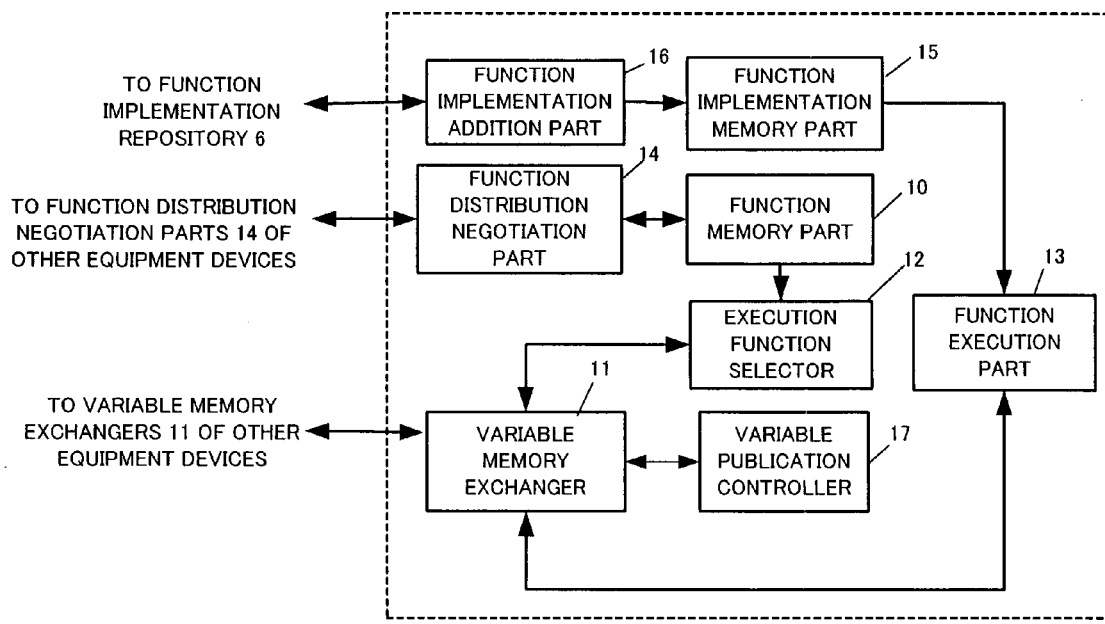
FIG. 2 is a block diagram showing a configuration of each network device used in the network equipment system of FIG. 1.

As shown in FIG. 2, the home server 3, the information display device 4, and the air-conditioning control device 5 each have a function memory part 10, a variable memory exchanger 11, an execution function selector 12, a function execution part 13, a function distribution negotiation part 14, a function implementation memory part 15, an function implementation addition part 16, and a variable publication controller 17.

The function memory part 10 stores the functions which need to be executed by its own network device. As to the function needs to be executed by its own network device, there are roughly three kinds of following functions.

First, the function is a function peculiar to its own network device which can not be executed by another network device. For example, if there is a function which reads a value of the temperature sensor of the air-conditioning control device 5, only the air-conditioning control device 5 having the temperature sensor can perform the function. As above, the function memory part 10 stores at least a function peculiar to its own network device.

Secondly, the function is a function delegated from other network devices by a result of negotiation with the center server 1, or the home server 3, or other network devices.

Thirdly, the function is a function which was stored in the function memory part 10 at a factory of the network device and is not delegated to another network device.

The variable memory exchanger 11 is connected to each network device through the telecommunications line, such as a LAN and the Internet connection, and it stores variables necessary for the execution of the functions stored in the function memory part 10 of each network device, and it shares the variables among the network devices. As to the way to share the variables, for example, the variable memory exchanger 11 in which a shared variable was updated may transmit an updated list of the shared variables to the variable memory exchanger 11 of each network device by multicasting, and each variable exchanger 11 which received the updated list of the shared variables may store the shared variable listed in the updated list.

The execution function selector 12 refers the variables shared by the variable memory exchanger 11, and it selects an executable function out of the functions stored in the function memory part 10 of its own network device.

The function execution part 13 executes the function selected by the execution function selector 12 with (in other words, through the use of) the variable(s) stored in the variable memory exchanger 11. Furthermore, the function execution part 13 updates the variable(s) stored in the variable memory exchanger by a variable obtained by the execution of the function.

The function implementation memory part 15 stores function implementation which is necessary for the function execution part 13 to execute the function(s) stored in the function memory part 10.

Figure 3:
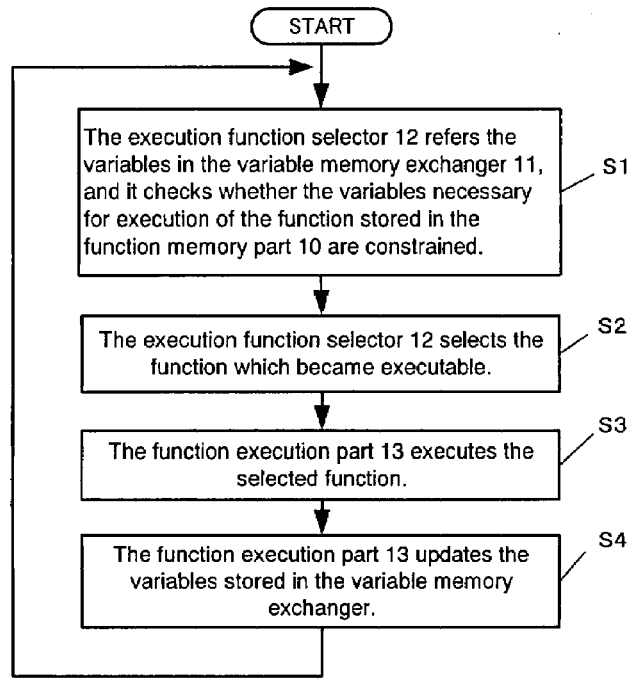
FIG. 3 is a flow chart for explaining a procedure for executing a function in the network equipment system of FIG. 1.

Hereinafter, the variable memory exchanger 11, the execution function selector 12, the function execution part 13, and the function implementation memory part 15 will be described in detail with reference to a flow chart of FIG. 3.

Now, it is supposed that following two functions are stored in the function memory part 10 of a certain network device. In other words, it is supposed that following two functions are assigned to a certain network device.

$$c = f(a, b);\qquad\text{(function 1)}$$

$$e = g(d);\qquad\text{(function 2)}$$

wherein "a", "b", "c", and "d" each are a variable, and f(a, b) means a function whose arguments are the variables "a" and "b", and g(d) means a function whose argument is the variables "d".

The execution function selector 12 refers the variables shared by the variable memory exchanger 11, and it checks whether the variables "a", "b", and "d" necessary for the execution of the functions f(a, b), g(d) stored in the function memory part 10 of its own network device are constrained or not (Step S1). Concretely speaking, the execution function selector 12 performs a pattern matching between the variables "a", "b", and "d" which are necessary for the execution of the functions stored in the function memory part 10 of its own network device and the variables stored in the variable memory exchanger 11.

And now, it is supposed that both of the variables "a" and "b" are constrained in the variable memory exchanger 11 at some point. When the execution function selector 12 detects from the pattern matching that the variables "a" and "b" necessary for the execution of the function f(a, b) stored in the function memory part 10 of its own network device are constrained in the variable memory exchanger 11, it selects the function f(a, b) which became executable (Step S2).

When the function f(a, b) is selected by the execution function selector 12, the function execution part 13 obtains the implementation which is necessary for the execution of the function f(a, b) from the function implementation memory part 15, and it executes the function f(a, b) with the variables "a" and "b" stored in the variable memory exchanger 11 (Step S3). And, the function execution part 13 updates the variables stored in the variable memory exchanger 11 by the variable "c" (c=f(a, b)) which was obtained by the execution of the function (Step S4). By this, the variable "c" is newly stored in the variable memory exchanger 11, and it is shared among the network devices.

The variable "c" is not used by this network device, but it is used by another network device, and by the usage of the variable "c", a new variable is constrained (or updated), and in a similar way, the functions are executed one after another in a chain reaction.

In the meantime, this network device returns to the Step S1, and it refers, again, the variables shared by the variable memory exchanger 11 and checks whether the variable "d" necessary for the execution of the function g(d) stored in the function memory part 10 of its own network device are constrained or not. When the variable "d" is constrained at some point, the function g(d) which became executable is selected (Step S2). And, the function execution part 13 obtains the implementation which is necessary for the execution of the function g(d) from the function implementation memory part 15, and it executes the function g(d) (Step S3). And, the function execution part 13 updates the variables stored in the variable memory exchanger 11 by the obtained variable "e" (e=g(d)) (Step S4).

As mentioned above, in this network equipment system of the functional processing system, the function whose variable necessary for the execution of the function was constrained out of the functions of the whole system is executed one after another in sequence, and as a result, all the functions of the whole system are executed.

Instead of that the execution function selector 12 refers the variable memory exchanger 11 at regular time intervals, when a variable is updated, the update may trigger the variable memory exchanger 11 to signal an event to the execution function selector 12 of its own equipment device. Or, instead of that the execution function selector 12 refers all the variables shared in the variable memory exchanger 11, the execution function selector 12 may partially refer only necessary variables defined in advance. In this case, as compared with a case that the execution function selector 12 refers all the variables stored in the variable memory exchanger 11, it is possible to reduce the load of the execution function selector 12, and it is possible to increase the reference speed of the execution function selector 12.

Next, the function distribution negotiation part 14 will be described in detail. The function distribution negotiation part 14 is connected to the function distribution negotiation part 14 of other network devices through the LAN and so on, and it has capability of delegating the functions stored in the function memory part 10 to other network devices.

As described earlier, because this network equipment system is the functional processing system, any network device can execute a function except for a function peculiar to each network device, and it is possible to perform optimization and enhance the ability of the system by distributing the functions appropriately to each network device.

Instead of distributing the functions centrally by the center server 1 or the home server 3, the function distribution negotiation part 14 is provided to distribute the functions assigned to its own network device to other network devices dynamically and dispersively by each network device.

The timing when the function distribution negotiation part 14 is activated is not particularly limited, but the function distribution negotiation part 14 may be activated, for example, when the processing capacity of its own equipment device approaches its limit (in this case, each equipment device has a detection means for monitoring the capacity usage ratio of the CPU of its own equipment device), or when a new network device is added to the system, or the software of the network system is updated, and so on.

When the function distribution negotiation part 14 is activated, it negotiates with the function distribution negotiation parts of other network devices about the calculation entity of the functions except for the function peculiar to each network device out of the functions stored in the function memory part 10 of its own network device. Concretely speaking, the function distribution negotiation part 14 makes an inquiry to each network device about its processing load (including the processing time, the processing capacity, and so on) by multicasting, and it receives an answer from each network device. Then, according to the answer, it finally determines the network device which is most suitable to delegate the function. Preferably, it determines the network device to delegate the function in consideration of not only the processing load but also conditions such as overhead of communication. If the function distribution negotiation part 14 judges that its own network device is most preferable to perform the function from the answer, it does not delegate the function to perform it by its own network device.

The network device to which the function was delegated stores the delegated function in the function memory part 10. And since then, the function is performed by the network device.

As mentioned above, it is possible to perform optimization and enhance the ability of the system dynamically and dispersively by changing the calculation entity of the functions dynamically according to the load status, the processing time, and the processing capability.

Hereinafter, the function distribution negotiation part 14 will be illustrated with a concrete example.

Figure 4A:
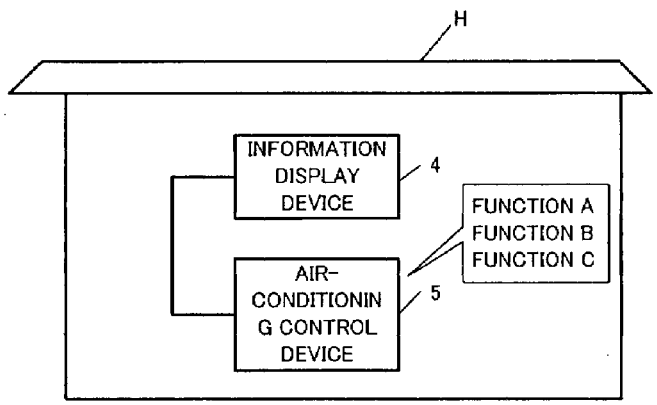
FIG. 4A is a view for explaining delegation of a function in the network equipment system of FIG. 1.

In FIG. 4A, it is supposed that the air-conditioning control device 5 and the information display device 4 are installed in a home. The air-conditioning control device 5 and the information display device 4 are connected to each other through a LAN, and when a user uses the air-conditioning control device 5, an operation screen of the air-conditioning control device 5 is shown on the display of the information display device 4, and the user can operate the air-conditioning control device 5 while seeing the display of the information display device 4.

It is also supposed that functions A, B, and C are assigned to the air-conditioning control device 5 and these functions are stored in the air-conditioning control device 5. The function A is a function peculiar to the air-conditioning control device 5 (here, the function A is supposed to be a function to read a value of the temperature sensor of the air-conditioning control device 5.), and the functions B and C are not peculiar to the air-conditioning control device 5, so it is possible to delegate them to other network devices. The function C is supposed to be a function to create the operation screen of the air-conditioning control device 5 to be shown on the information display device 4 (hereinafter, called a graphic generation function C).

In the case of FIG. 4A, first, the function A of the air-conditioning control device 5 (that is, the function to read a value of the temperature sensor) is executed by the air-conditioning control device 5. Next, the functions B, C, or another function of the information display device 4 is executed based on the variable(s) constrained by the execution of the function A. Then, another function is executed based on a variable (or variables) constrained by the execution of the function, and in a similar way, all the functions of the information display device 4 and the air-conditioning control device 5 are accordingly executed one after another in chronological order.

In another example, for example, in a home security system, a human detection sensor, a lighting apparatus, a camera device, an information display device, a home server, and so on operate as the network devices. First, the human detection sensor executes a function for human detection, and it constrains a variable resulted from the execution of the function in its own variable memory exchanger 11, and it shares the variable with each network device. Next, in response to the constraint of the variable, functions which use the constrained variable as an input in the lighting apparatus and the camera device are executed, and as a result, for example, the lighting apparatus may illuminate the light, or the camera device may start to shoot. Furthermore, when the camera device constrains a variable (for example, a variable which means a shooting time and so on), as a result of processing the function, and shares the variable among the network devices, the home server execute a function for showing the shooting time on the information display device, such as a TV having a web browser, by using the variable as input. As above, it is possible to realize the home security system.

By the way, in the case of FIG. 4A, because the graphic generation function C is assigned to the air-conditioning control device 5, the operation screen of the air-conditioning control device 5 is created by the air-conditioning control device 5 itself. However, because the air-conditioning control device 5 has poor processing capacity, it can only show a simple operation screen on the information display device 4.

Figure 4B:
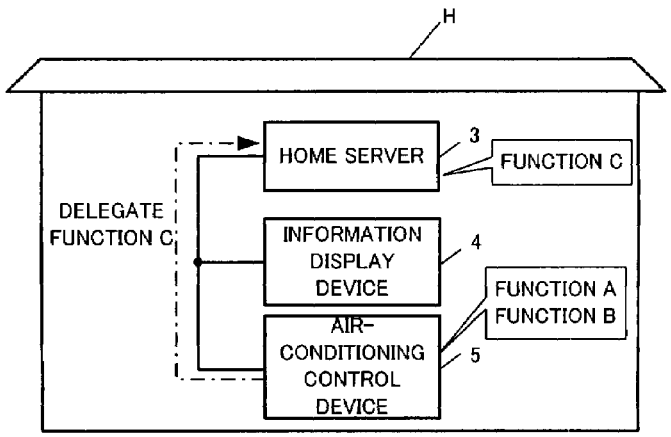
FIG. 4B is a view for explaining the delegation of the function in the network equipment system of FIG. 1.

Here, as shown in FIG. 4B, it is supposed that the home server 3 with high processing capacity is added to the network equipment system of FIG. 4A. When the home server 3 is newly installed in the system, the function distribution negotiation parts 14 of the air-conditioning control device 5, the home server 3, and the information display device 4 start a negotiation about the calculation entities of the functions by a trigger caused by the new installation of the network device to the system.

The air-conditioning control device 5 makes an inquiry to the home server 3 and the information display device 4 by multicasting about the processing time necessary for the execution of the functions B and C stored in the function memory part 10 and the processing capacity thereof. Because the function A is peculiar to the air-conditioning control device 5, it is not a subject of the negotiation.

As a result of the inquiry, if it is found that, as to the function C (that is, the graphic generation function C), the home server 3 is superior to the air-conditioning control device 5 and the information display device 4 in the processing time and the processing capacity, the air-conditioning control device 5 delegates the function C to the home server 3.

The home sever 3 to which the function C was delegated stores the function C in the function memory part 10 of the home server 3, and since then, the function C is performed by the home server 3. Because the home server 3 can draw a figure in a short amount of time and has high processing capacity, it is possible to show a colorful operation screen on the display of the information display device 4 with high-speed.

The functions A and B which were not delegated are executed by the air-conditioning control device 5 as heretofore.

As mentioned above, it is possible to change the calculation entity of a function dynamically by the function distribution negotiation parts 14, whereby it is possible to perform optimization of the system and to enhance the ability of the system. Furthermore, because the function of the functional processing system has no side-effect, even if a function is delegated, it does not affect the original action of the target network device. That is, in the case of FIG. 4B, even if the graphic generation function C of the air-conditioning control device 5 is delegated, the original action of the home server 3 can be ensured. Of course, the action of the air-conditioning control device 5 can be also ensured.

Although the processing time and graphic generation ability are increased by the function distribution negotiation part 14 in FIGS. 4A and 4B, it is of course possible to increase other abilities, such as a history reference ability which refers the history of operation condition, and an ability to lower the power consumption, by the function distribution negotiation parts 14.

And, in FIGS. 4A and 4B, although the negotiation range of the function distribution negotiation part 14 includes only the network devices 3, 4 and 5 installed in the home, if the network devices in the home are connected to the center server 1 thorough the Internet 2 as shown in FIG. 1, each function distribution negotiation part 14 may negotiate in a range including the center server 1. If a function is delegated to the center server 1, it may be possible to further increase the processing ability.

By the way, when a new function is delegated by the function distribution negotiation part 14, it may happen that the implementation of the function is not stored in its own function implementation memory part 15. It may be possible to store the implementation of all the functions used in the system in the function implementation memory part 15, but it is a waste of storage space, and it is not practical. And furthermore, it is not possible to deal with a newly added function. So, as shown in FIG. 2, it is preferable that each network device has a function implementation addition part 16. The function implementation addition part 16 is connected to the function implementation repository 6 of the center server 1 through the Internet 2. When a function whose implementation is not stored in its own function implementation memory part 15 is delegated by the function distribution negotiation part 14, the function implementation addition part 16 obtains the implementation of the function from the function implementation repository 6 through the Internet. By this, it becomes possible for the function execution part 13 to execute a function even if the implementation of the function is not stored in its own function implementation memory part 15. Furthermore, even if a new network device is added to the system, by just storing the implementation of the network device in the function implementation repository 6, it becomes possible for any network device to execute the function. The function implementation addition part 16 may obtain implementation of a function from not only the function implementation repository 6 but also the network device which delegated the function.

As shown in FIG. 2, in a more preferable system configuration, each network device has a variable publication controller 17. The variable publication controller 17 classifies the variables stored in the variable memory exchanger 11 into a shared variable which is to be shared among the network devices and a non-shared variable which is not shared among the network devices, and the variable memory exchanger 11 shares only the shared variables among the network devices though the telecommunications line.

In more detail, the number of variables shared in the variable memory exchanger 11 increases as the system becomes larger. However, it is not necessary to share all variables. For example, in a case where a variable α which is constrained by the execution of a certain function X is used by another function Y, if both of the functions X and Y are executed by the same network device, it is not necessary to open (in other word, share) the variable α. Therefore, in this case, the variable publication controller 17 classifies the variable α into the non-shared variable, and the variable memory exchanger 11 does not share the variable α among the network devices. If the function X and the function Y are executed by different network devices, it is necessary to open (share) the variable α, so the variable publication controller 17 classifies the variable α into the shared variable, and the variable memory exchanger 11 shares the variable α among the network devices though the telecommunications line. In addition, the result of the negotiation of the function distribution negotiation part 14 shows which variable should be made a shared variable. By providing the variable publication controller 17, it is possible to restrain unnecessary sharing of the variables, whereby it is possible to lower a network load for sharing the variables.

By constituting each network device as above, it is possible to realize the network equipment system of the distributed functional processing system. Because the network equipment system is configured by a combination of the functions of the functional processing system, even when a new network device is added, the capability (or function) of the new network device does not cause side-effects to the existing network devices, whereby it is possible to deal with the system change easily. Furthermore, it is possible to perform optimization of the whole system and to enhance the ability of the whole system by distributing the functions of the whole system appropriately to each network device (in FIG. 1, the center server 1, the home server 3, the information display device 4, and the air-conditioning control device 5). For example, when a security device (not shown) is added to the system of FIG. 1, because the functions set in the security device does not give side-effects to the functions of the existing network devices, it is easy to add the security device to the system, and, it is also possible to delegate functions of the security device which take a role in capability except for a detection capability of the security device to each network device, according to the processing load of them. As to the method for distributing the functions, the center server 1 or the home server 3 may distribute the functions centrally, or each network device may distribute the functions to each other by the function distribution negotiation part 14 in a distributed manner. Regardless of how to distribute the functions, it is possible to mathematically ensure that the behavior of the whole system does not change. Furthermore, because the functional processing system does not depend on execution sequence, there is no danger of generating deadlock.

As mentioned above, as many apparently widely different embodiments of this invention may be made without departing from the spirit and scope thereof, it is to be understood that the invention is not limited to the specific embodiments thereof except as defined in the appended claims.

The invention claimed is:

1. A network equipment system in which a plurality of network devices connected to a telecommunications line perform a predetermined action in concert with each other,
a whole system being configured by a combination of functions, and said network equipment system being configured so that each network device performs a function assigned to itself whereby the system performs the predetermined action as a whole,
each network device comprising:
a function memory part; said function memory part storing the functions which need to be executed by its own network device,
a variable memory exchanger; said variable memory exchanger being connected to each network device through the telecommunications line, and storing a variable necessary for execution of the functions stored in said function memory part of each network device, and sharing said variable among the network devices,
an execution function selector; said execution function selector referring said variable stored in said variable memory exchanger and selecting an executable function out of said functions stored in said function memory part of its own network device,
a function execution part; said function execution part executing the function selected by said execution function selector with the variable stored in said variable memory exchanger and updating the variable stored in said variable memory exchanger by a variable obtained by the execution of the function.

2. The network equipment system using a distributed functional processing system as set forth in claim 1, wherein
said function memory part stores at least a function peculiar to its own network device.

3. The network equipment system using a distributed functional processing system as set forth in claim 1, wherein
each network device further comprises a function distribution negotiation part, said function distribution negotiation part being connected to other network devices through the telecommunications line, and having capability of delegating, to other network devices, a function other than a function peculiar to its own network device out of the functions stored in said function memory part,
said function memory part storing the function which was delegated from other network devices by said function distribution negotiation part.

4. The network equipment system using the distributed functional processing system as set forth in claim 3, wherein
said function distribution negotiation part makes an inquiry to each network device about its processing load, and receiving an answer from each network device, and determining the network device to which the function is delegated, based on the answer.

5. The network equipment system using the distributed functional processing system as set forth in claim 3, wherein
at least one of the plurality of network devices has a function repository for storing implementation of the function which is used in the network equipment system,
each network device further comprising:
a function implementation memory part for storing implementation of a predetermined function which is necessary for said function execution part to execute the function, and
a function implementation addition part which obtains, from said function repository, the implementation of a function which is not stored in said function implementation memory part out of the functions delegated from other network devices by said function distribution negotiation part.

6. The network equipment system using a distributed functional processing system as set forth in claim 1, wherein each network device further comprises a variable publication controller which classifies variables stored in said variable memory exchanger into a shared variable which is to be shared among the network devices and a nonshared variable which is not shared among the network devices, said variable memory exchanger sharing only said shared variable among the network devices though the telecommunications line.

7. The network equipment system using a distributed functional processing system as set forth in claim 1, wherein said plurality of network devices include at least a center server, a home server installed in a home, and an equipment device installed in the home.

* * * * *